United States Patent
Hassan et al.

(10) Patent No.: US 9,908,617 B2
(45) Date of Patent: Mar. 6, 2018

(54) ACTIVE FLOW CONTROL FOR TRANSONIC FLIGHT

(75) Inventors: Ahmed A. Hassan, Mesa, AZ (US); Casey L. Madsen, Normandy Park, WA (US); Garrett M Billman, Troy, MO (US); Mary M. Billman, legal representative, Troy, MO (US)

(73) Assignee: The Boeing Company, Chicago, IL (US)

( * ) Notice: Subject to any disclaimer, the term of this patent is extended or adjusted under 35 U.S.C. 154(b) by 1611 days.

(21) Appl. No.: 13/114,006

(22) Filed: May 23, 2011

(65) Prior Publication Data

US 2011/0309201 A1   Dec. 22, 2011

Related U.S. Application Data

(63) Continuation-in-part of application No. 11/188,386, filed on Jul. 25, 2005, now abandoned.

(51) Int. Cl.
*B64C 3/00* (2006.01)
*B64C 15/14* (2006.01)
*B64C 21/02* (2006.01)

(52) U.S. Cl.
CPC .............. *B64C 15/14* (2013.01); *B64C 21/02* (2013.01); *B64C 2230/02* (2013.01); *Y02T 50/166* (2013.01)

(58) Field of Classification Search
USPC ........... 244/207–209, 200.1, 201, 204, 204.1
See application file for complete search history.

(56) References Cited

U.S. PATENT DOCUMENTS

| | | | | |
|---|---|---|---|---|
| 2,219,234 A | * | 10/1940 | Messerschmitt | 244/209 |
| 2,585,676 A | * | 2/1952 | Poisson-Quinton | 244/208 |
| 4,660,788 A | * | 4/1987 | Thiede | 244/209 |
| 4,664,345 A | * | 5/1987 | Lurz | 244/209 |
| 4,693,201 A | * | 9/1987 | Williams et al. | 114/67 R |
| 5,335,885 A | * | 8/1994 | Bohning | 244/204 |
| 5,957,413 A | * | 9/1999 | Glezer et al. | 244/208 |
| 5,988,522 A | * | 11/1999 | Glezer et al. | 239/11 |
| 6,302,360 B1 | * | 10/2001 | Ng | 244/203 |
| 6,471,477 B2 | * | 10/2002 | Hassan et al. | 416/90 A |
| 6,796,533 B2 | * | 9/2004 | Barrett et al. | 244/208 |
| 6,899,302 B1 | * | 5/2005 | Hassan et al. | 244/208 |
| 2002/0081198 A1 | * | 6/2002 | Hassan et al. | 416/90 A |
| 2002/0195526 A1 | * | 12/2002 | Barrett et al. | 244/208 |
| 2003/0150962 A1 | * | 8/2003 | Orban | 244/209 |
| 2005/0040293 A1 | * | 2/2005 | Hassan et al. | 244/208 |
| 2006/0102801 A1 | * | 5/2006 | Manley | 244/208 |

* cited by examiner

*Primary Examiner* — Philip J Bonzell
(74) *Attorney, Agent, or Firm* — Miller, Matthias & Hull LLP

(57) ABSTRACT

An air vehicle includes an airfoil designed for transonic flight. The airfoil has a region of supersonic flow during transonic flight. A surface of the airfoil has upstream and downstream orifices at or within the region. The air vehicle further includes an active flow control system for controlling air vehicle motion during transonic flight by controlling flow through the orifices to alter strength and location of a shock wave in the region. The system creates an aerodynamic imbalance to move the shock wave.

20 Claims, 5 Drawing Sheets

FIG. 2
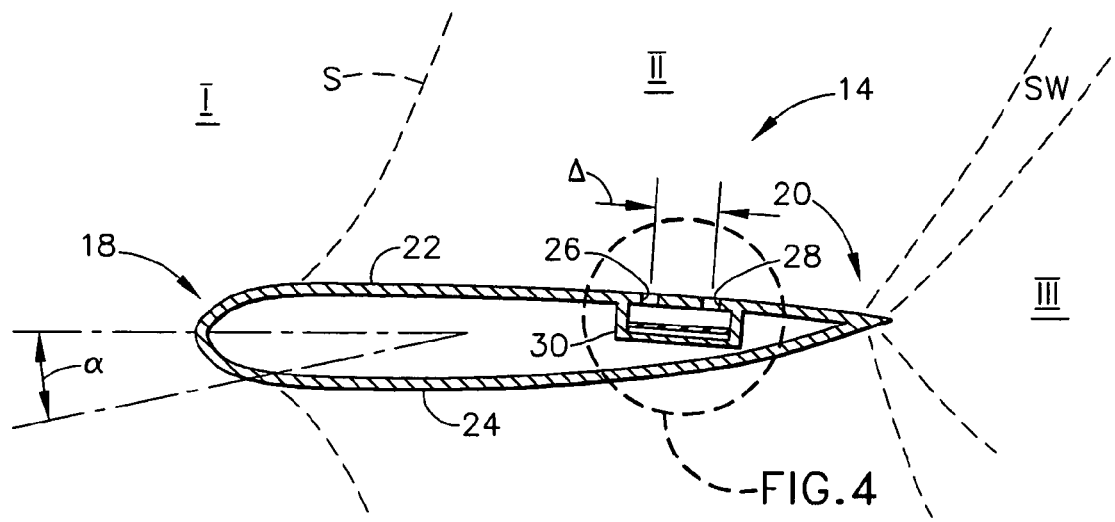
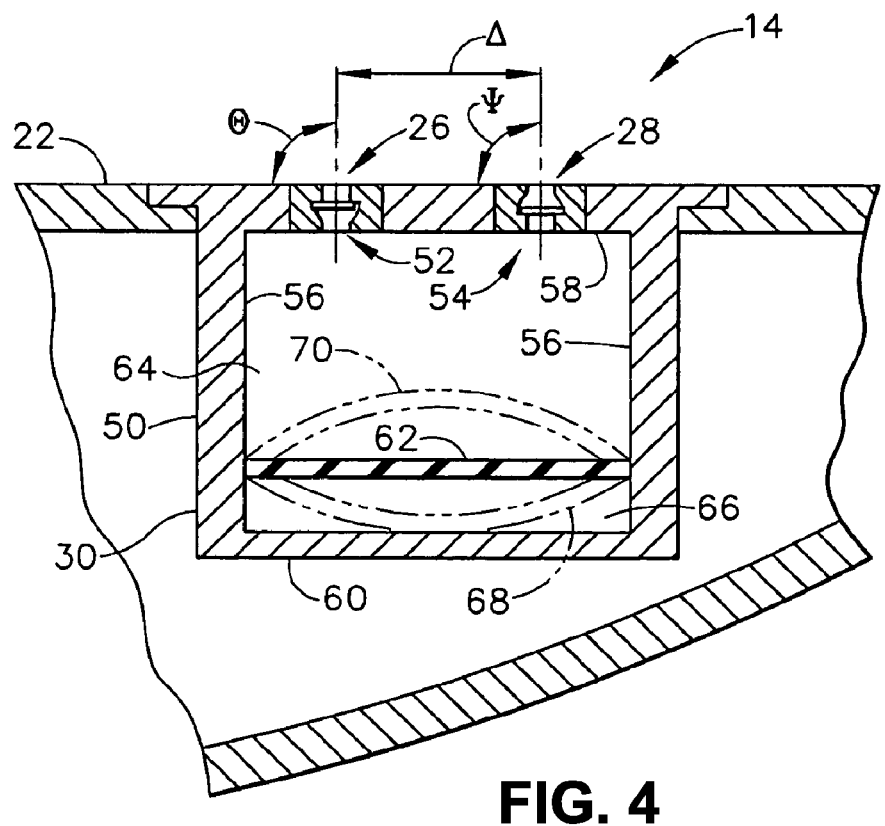
FIG. 4

ACTIVE FLOW CONTROL FOR TRANSONIC FLIGHT

This is a continuation-in-part of copending U.S. Ser. No. 11/188,386 filed 25 Jul. 2005.

BACKGROUND

Attitude of air vehicles, including aircraft and missiles, is typically controlled by flight control surfaces such as flaps, spoilers, ailerons, rudders, elevators, and fins. These flight control surfaces require substantial infrastructure, such as hinge structures, hydraulic or pneumatic actuators, and complex under-surface fluid delivery systems to drive the actuators. The infrastructure increases vehicle complexity, manufacturing cost and weight, and it reduces vehicle performance.

SUMMARY

According to an embodiment herein, an air vehicle includes an airfoil designed for transonic flight. The airfoil has a region of supersonic flow during transonic flight. A surface of the airfoil has upstream and downstream orifices at or within the region. The air vehicle further includes an active flow control system for controlling air vehicle motion during transonic flight by controlling flow through the orifices to alter strength and location of a shock wave in the region. The system creates an aerodynamic imbalance to move the shock wave.

According to another embodiment herein, an aircraft includes opposing first and second wings for transonic flight, where each wing has an upper surface and a lower surface. The upper surface has a region of supersonic flow. The upper surface of each wing has an upstream orifice at a beginning of the region, and a downstream orifice at an end of the region. The upstream orifice is in fluid communication with the downstream orifice. The aircraft further includes an active flow control system for controlling flow of air into the upstream orifice and out of the downstream orifice of at least one of the wings during transonic flight to alter strength and location of a shock wave in the region. The strength and location of the shock wave are altered to control motion of the aircraft during transonic flight.

According to another embodiment herein, a method of operating an air vehicle having a surface designed for transonic air flow includes operating the air vehicle under transonic conditions, whereby a shock wave is present at a region of the surface; and controlling motion of the air vehicle during transonic flight. The motion control includes drawing air into a first orifice at a beginning of the shock wave and pushing air out of a second orifice at an end of the shock wave such that strength and location of the shock wave is altered to create an aerodynamic imbalance.

BRIEF DESCRIPTION OF THE DRAWINGS

FIG. 2 is a cross sectional view of the air vehicle taken along line 2-2 of FIG. 1 showing transonic characteristics adjacent the air vehicle.

FIG. 4 is an enlarged cross sectional view of a portion of the air vehicle of FIG. 2.

DETAILED DESCRIPTION

Figure 6:
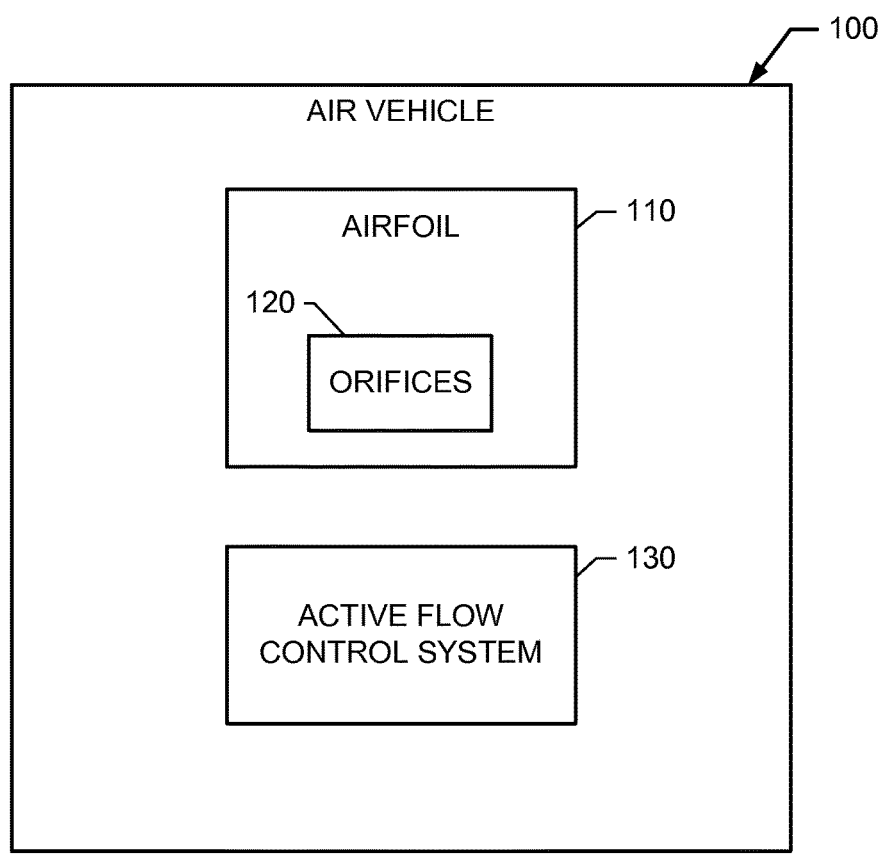
FIG. 6 is an illustration of an air vehicle including an airfoil and an active flow control system for transonic flight.

Reference is made to FIG. 6, which illustrates an air vehicle 100 including an airfoil 110 designed for transonic flight. The airfoil 110 has a region of supersonic flow during transonic flight. Upstream and downstream orifices 120 on a surface of the airfoil 110 allow flow to enter and exit.

The air vehicle 100 further includes an active flow control system 130 for controlling vehicle motion during transonic flight. The active flow control system 130 controls air flow through the upstream and downstream orifices 120 during transonic flight to alter strength and location of a shock wave (which is present during transonic flight). The system 130 creates an aerodynamic imbalance through "virtual" changes to the local surface slope of a supersonic flow pocket, thereby moving the shock wave forward or aft depending on flight conditions (e.g., Mach number, angle of attack, dynamic pressure). Through these virtual changes, the active flow control system 130 forces physical changes in lift, drag, side forces, and/or moments (rolling, yawing and/or pitching motions). The upstream orifice 120 is preferably placed at the beginning of the shock wave and the downstream orifice 120 is preferably placed at the end of the shock wave. The orifices 120 may be placed within the region of supersonic flow (between the forward and aft shock lines) and will still be able to control the shock wave, though not as effectively.

Figure 1:
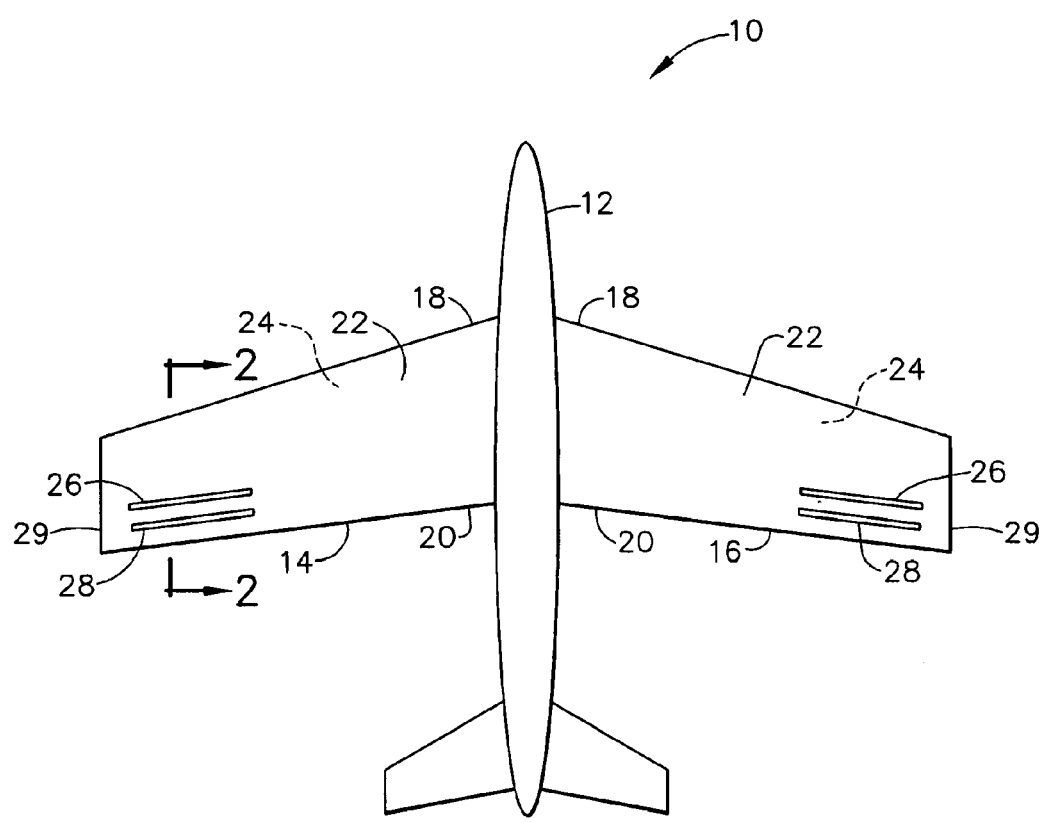
FIG. 1 is a plan view of an air vehicle.

Reference is now made to FIG. 1, which illustrates an air vehicle 10 for transonic flight. The air vehicle 10 includes a fuselage 12 and opposite first and second wings 14 and 16 extending laterally from the fuselage 12. Each wing 14 and 16 has a leading edge 18, a trailing edge 20, an upper (or first) surface 22 extending between the edges 18 and 20, and a lower (or second) surface 24 extending between the edges 18 and 20.

Each wing 14 and 16 includes an upstream orifice 26 and a downstream orifice 28 positioned on at least one of the first surfaces 22. FIG. 1 shows the orifices 26 and 28 positioned on the first surface 22 of both wings 14 and 16. The upstream orifices 26 are preferably placed at the beginning of a shock wave region, and the downstream orifices 28 are preferably placed at the end of the shock wave region. The orifices 26 and 28 may have shapes such as elongate slits, as shown in FIG. 1. In other embodiments, however, the orifices 26 and 28 may have other shapes, such as circular or oval. In one embodiment, each slit has a length of between about 15% and about 25% of wing span (the span of the wing 14 is the line between tips 29 of the wings 14 and 16). In one embodiment, each slit has a width of between about 0.025 inches and about 0.055 inches. Variables affecting the lengths and widths of the orifices 26 and 28 include the type of wings 14 and 16. Wing types may include low-profile and high-profile.

Each second surface 24 is substantially free of orifices, preventing air from being drawn into or directed out of the wings 14, 16 through the second surface during operation of the air vehicle 10.

In some embodiments (not shown), the orifices 26 and 28 may be used in combination with one or more conventional control surfaces. Although the first surfaces 22 are shown as upper surfaces and the second surfaces 24 are shown as lower surfaces of the wings 14 and 16, in some embodiments the first surfaces may be the lower surfaces and the second surfaces may be the upper surfaces.

As shown in FIG. 2, the air vehicle 10 further includes an actuator 30 positioned within at least one wing 14 and 16 between the leading edge 18 and the trailing edge 20 and between the first surface 22 and the second surface 24. Although a single actuator 30 is shown associated with a single set of orifices 26 and 28, multiple actuators (not shown) may be operatively connected to a single set of slits or a single actuator may be operatively connected to multiple sets of slits. In one embodiment (not shown), one or more actuators are associated with the upstream orifice 26 and one or more separate actuators are associated with the downstream orifice 28.

A timing relationship between the drawing of air into the upstream orifice 26 and the pushing of air away from the downstream orifice 28 may be characterized by a phase differential. The drawing and pushing of air may occur in phase (i.e., 0° phase difference), completely out of phase (i.e., 180° phase difference), or anywhere between. In one embodiment, the actuator 30 is selectively operated to vary the phase differential between in phase and completely out of phase. A waveform of a velocity of air moving into the upstream orifice 26 and a waveform of a velocity of air moving out of the downstream orifice 28 with respect to time may have various shapes. In one embodiment the waveforms each have a sinusoidal shape, increasing from zero velocity to a maximum velocity and then gradually decreasing back to zero velocity. In another embodiment, the waveforms are square, quickly stepping from zero velocity to a maximum velocity, continuing at the maximum velocity, and then quickly stepping back to zero velocity.

FIG. 2 also shows aerodynamic characteristics that exist adjacent the wing 14 as it operates under transonic conditions. Transonic conditions exist when air in a first region I adjacent the leading edge 18 of the wing 14 is moving at subsonic speeds with respect to the wing, air in the second region II adjacent the wing is moving at supersonic speeds with respect to the wing, and air in a third region III adjacent the trailing edge 20 of the wing is moving at subsonic speeds with respect to the wing. A sonic line "S" extends between and separates the first region I and the second, supersonic, region II. A shock wave "SW" extends from the wing 14 adjacent the trailing edge 20 and separates the second, supersonic, region II and the third region III. Whether transonic conditions exist adjacent the wing 14 during flight depends on variables including the shape of the air vehicle 10 and a Mach number and an angle of attack ($\alpha$) at which the air vehicle 10 is moving. The Mach number of a moving object is the ratio of the speed of the object to the speed of sound. In one embodiment, transonic conditions exist adjacent the wing 14 when the air vehicle 10 is flown at a Mach number between about 0.55 and about 1.0. The angle of attack ($\alpha$) of an airfoil during flight is the angle between a chord of the airfoil and a velocity vector of the airfoil. The chord is the line between the leading edge 18 and the trailing edge 20 of the wing 14 generally bisecting the wing. Although transonic conditions may exist adjacent the air vehicle 10 with other angles of attack ($\alpha$), in one embodiment transonic conditions exist adjacent the air vehicle when the angle of attack ($\alpha$) is between about −5 degrees and about 5 degrees. For example, a commercially available NACA-64A010 airfoil (not shown), transonic conditions exist adjacent the airfoil when the angle of attack ($\alpha$) is about 2 degrees and the Mach number is about 0.95.

The orifices 26 and 28 are positioned within the supersonic flow region II and upstream of a shock wave SW that is present when the air vehicle 10 is traveling at transonic conditions. The positions of the orifices 26 and 28 can be described with respect to the chord of the wing 14. A chord position can be described by the percentage of the total chord the orifices 26 and 28 lie from the leading edge 18. In one embodiment the upstream orifice 26 is located at a chord position of between about 50% and about 70% and the downstream orifice 28 is located at a chord position of between about 65% and about 90%. For example, for the NACA-64A010 airfoil, 53% and 68% are effective chord positions for the first and second orifices 26 and 28. In the embodiment illustrated in FIG. 2, the orifices 26 and 28 are shown at about 68% chord and about 85% chord, respectively. In the embodiment illustrated in FIG. 3, upstream and downstream orifices 46 and 48 are shown at about 58% chord and about 91% chord, respectively.

The downstream orifice 28 may be located at almost 100% chord and still be positioned adjacent the supersonic region II because the supersonic region may end at the shock wave SW, which generally extends from the trailing edge 20 of the wing 14. In one embodiment (not shown), the upstream orifice 26 is positioned at the sonic line S. In one embodiment, the space (A) between orifices 26 and 28 may be between about 15% and about 40% of the chord length. For example, for the NACA-64A010 airfoil, a space between the upstream and downstream orifices measures about 15% of the chord length.

Additional reference is made to FIG. 4. In one embodiment the upstream orifice 26 is configured so the air is drawn toward the upstream orifice 26 at an angle ($\Theta$) between about 80 degrees and about 100 degrees with respect to the surface 22 in the region adjacent the orifice 26, and the downstream orifice 28 is configured so air is pushed away from the downstream orifice at an angle ($\psi$) of between about 80 degrees and about 100 degrees with respect to the surface 22 in the region adjacent the orifice 28. In other embodiments, the orifices 26 and 28 may be configured so air is drawn toward the upstream orifice 26 and pushed away from the downstream orifice 28 at other angles.

As shown in FIG. 4, each orifice 26 and 28 includes a one-way port or valve 52, 54, allowing air to only move into the upstream orifice 26 through the valve 52 associated therewith and out of the downstream orifice 28 through the valve 54 associated therewith. The one-way valves 52 and 54 may be passive or active. Passive valves allow air to pass in one direction at a rate that depends on the pressure of the air entering the valve and valve structural variables, such as the material, weight, size, and shape of the valve. Active one-way valves allow air to pass in only one direction and regulate the amount of air that passes through. For example, an active one-way valve can regulate the amount of air that passes through by stiffening a flap around which air passes as the flap bends or by otherwise controlling the bend of the flap.

In one embodiment, the actuator 30 may be a piezoelectric actuator. In other embodiments, other actuator types such as pneumatic, electromagnetic, and other electromechanical actuators may be used, such as those including a cam or piston (not shown). A benefit of using these actuators is quick response time compared to traditional flight control systems.

The actuator 30 shown in FIG. 4 includes sides 56, a top 58, and a bottom 60. Adjacent the bottom 60 is a diaphragm, bellow, or membrane 62. The top 58 includes the valves 52 and 54. The sides 56, top 58, and membrane 62 define a first chamber 64 therebetween. Below the membrane 62 is a second chamber 66. Although the first chamber 64 is shown being adjacent to the valves 52, 54, it is contemplated that the first chamber may be connected to the valves by way of pipes or passages.

The membrane 62 is made of a flexible material that allows flexing between a concave position 68 and a convex position 70. A piezoelectric actuator can move the membrane 62 between the concave and convex positions 68 and 70 in response to electrical currents applied to the membrane 62. The membrane 62 can be intermittently moved between its concave and convex positions 68 and 70 to intermittently create a negative pressure at the upstream orifice 26 and a positive pressure at the downstream orifice 28. When the membrane 62 moves toward the concave position 68, pressure within the first chamber 64 decreases to a pressure lower than an ambient pressure of air outside of the wing 14 adjacent the orifices 26 and 28. Thus, air exterior to the wing 14 and adjacent the upstream orifice 26 is drawn toward and through the one-way valve 52 associated with the upstream orifice. When the membrane 62 moves toward the convex position 70, pressure within the chamber 64 increases to a pressure higher than an ambient pressure of air outside of the wing 14 adjacent the orifices 26, 28. Thus, air within the first chamber 64 is pushed through and away from the one-way valve 54 associated with the downstream orifice 28. As described above, the upstream orifice 26 can be configured so air is drawn to it normal (i.e., at 90 degrees) to the adjacent first surface 22 and the downstream orifice 28 can be configured so the air is pushed away from it normal to the first surface.

The actuator 30 may be vented (not shown) to facilitate movement of the membrane 62. For example, without venting, air pressure in the second chamber 66 is greatly increased as the membrane 62 attempts to move toward the concave position 68. The electrically actuated membrane 62 must move with a force sufficient to contract the air in the second chamber 66 enough to allow the membrane 62 to reach the concave position 68. Further, air accelerating through the supersonic region II over the wing 14 creates a negative pressure on the outside of the wing adjacent the orifices 26, 28. Thus, with a non-vented actuator, the membrane 62 must work against the increasing force resulting from the increasing pressure in the second chamber 66 and the opposite force resulting from the negative pressure differential above the wing surface 22 as it moves towards its concave position 68. These two forces impede actuator operation and may render it inoperable. Venting the actuator 30 allows free movement of the membrane 62 by balancing relative pressures. The actuator 30 may be vented in a variety of ways.

The membrane 62 may be continuously moved between its concave and convex positions 68 and 70 with a desired frequency to create a pulsing or periodic effect. In one embodiment, the actuator 30 operates at a frequency of between about 150 Hz and about 350 Hz (in other embodiments, the actuator may be operated at other frequency ranges). The amount and force of the air being drawn in and directed out by the actuator 30 depends on the configuration of the actuator 30, including the size of the membrane 62, and the intensity with which the membrane 62 is displaced. The air being drawing into and directed out of the actuator 30 modifies the strength and location of the shock wave to move the shock wave forward or aft depending on flight conditions, thereby forcing physical changes in lift, drag, and moments.

Although the orifices 26 and 28 represent discontinuities in the surface 22 of the air vehicle 10, these discontinuities have less affect on vehicle aerodynamics than the effects of the discontinuities (e.g., gaps), level mismatches, and structure (e.g., hinges) associated with traditional aerodynamic control surfaces. Moreover, the active flow control herein has a less complex infrastructure and lower maintenance than conventional flight control. Response time for changing vehicle motion is also faster.

Having orifices 26 and 28 instead of traditional control surfaces reduces aeroacoustic noise, such as cabin noise, by lowering the size and number of gaps in the surfaces 22, 24 of the wings 14, 16 and substantially eliminating level differences on those surfaces. Further, aeroacoustic noise that may result from shock waves during flight at transonic speeds can be attenuated through selective operation of the actuator 30. For example, characteristics (e.g., the path) of the air traveling adjacent the wing 14 can be changed to reduce the aeroacoustic noise associated with the shock wave.

A system including the actuator 30 and two orifices 26 and 28 is referred to as a dual point air flow control system because flight conditions can be controlled using these components. The particular force, volume, and frequency necessary to create particular changes in air vehicle 10 flight depends on geometries of the airfoil and flight conditions, such as the angle of attack (a) and Mach number at which the air vehicle is moving. Thus, all of these can be adjusted to control air vehicle attitude and/or attenuate aeroacoustic noise during flight. The actuator 30 may be operated to move the shock wave in a predetermined manner to control vehicle attitude. Further regarding attitude control, depending on airfoil geometries and flight conditions, the force, amount, and frequency of air pulsed in and out of the orifices 26 and 28 can affect lift, drag, side forces, and/or moments (i.e., yaw, pitch, and roll) experienced by the airfoil. These forces and/or moments are controlled by controlling the shape of the aerodynamic characteristics passing adjacent the airfoil. In one embodiment, the amount and force of air passing through the orifices 26 and 28 remain generally constant. In this embodiment, the frequency at which the actuator 30 is operated and changes to the frequency primarily determine the affects the actuator 30 has on the aerodynamic characteristics of the airfoil at any given angle of attack ($\alpha$) and Mach number. In embodiments where the orifices 26 and 28 and the actuator 30 are employed on only one wing 14 of a dual wing air vehicle 10, vehicle roll can be controlled by increasing or decreasing the amount of lift on that wing 14. In embodiments where the orifices 26 and 28 and the actuator 30 are employed on both wings 14, 16, the vehicle can be rolled by increasing or decreasing the lift on either of the wings 14, 16 by simultaneously increasing the lift on one of the wings 14, 16 and decreasing the lift on the other wing 16, 14, or by affecting a lift differential between the wings. In embodiments where orifices 26 and 28 and an actuator 30 are employed on only one wing 14 of a dual wing air vehicle 10, vehicle yaw can be controlled by increasing or decreasing the amount of drag on that wing 14. In embodiments where the orifices 26 and 28 and the actuator 30 are employed on both wings 14, 16, the vehicle can be yawed by increasing or decreasing the drag on either of the wings 14, 16 by simultaneously increasing the drag on one of the wings 14, 16 and decreasing the drag on the other wing 16, 14, or by affecting a drag differential between the wings. Air may also be selectively drawn into the upstream orifice 26 and directed out of the downstream orifice 28 to control pitch. For example, the actuator 30 may be selectively operated to create a level differential between the leading edge and trailing edge of the wings thereby controlling vehicle pitch.

Figure 3:
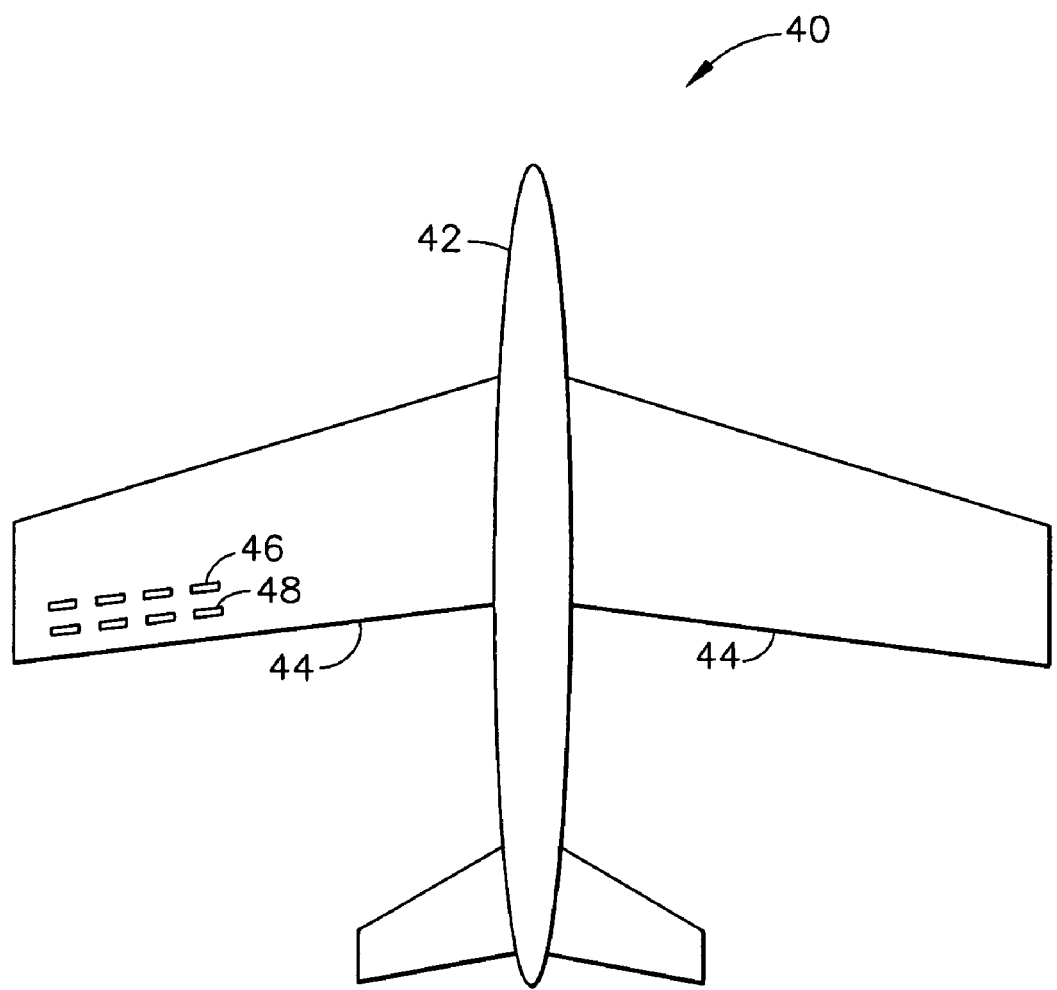
FIG. 3 is a plan view of an air vehicle.

FIG. 3 shows an embodiment including an air vehicle 40 having a fuselage 42, two wings 44 extending laterally from the fuselage, and multiple sets of orifices 46 and 48 arrayed along at least one of the wings. The orifices 46, 48 shown are generally rectangular. The orifices 46 and 48 may be operatively connected to one or more actuators (not shown).

As shown in FIG. 4, each actuator 30 and the corresponding orifices 26 and 28 may be contained in a separable drop-in unit 50. Units 50 can be dropped into one or both wings 14 and 16 during manufacture or during renovation of the air vehicle 10. In one embodiment (not shown), the orifices 26 and 28 are independently mounted on the wings 14, 16 and connected to the actuator 30. The actuator 30 is used to selectively create a negative pressure differential at the upstream orifice 26 so air adjacent the upstream orifice is drawn toward the upstream orifice at an angle of about 90° with the first surface and to create a positive pressure differential at the downstream orifice 28 so air adjacent the downstream orifice is pushed away from the downstream orifice at an angle of about 90° with the first surface.

Active flow control herein is not limited to air vehicles 10 having fixed wings 14 and 16. For example, orifices can be positioned on other air vehicle surfaces (e.g., aircraft or missile fuselage surfaces) and on rotor blades.

Figure 5:
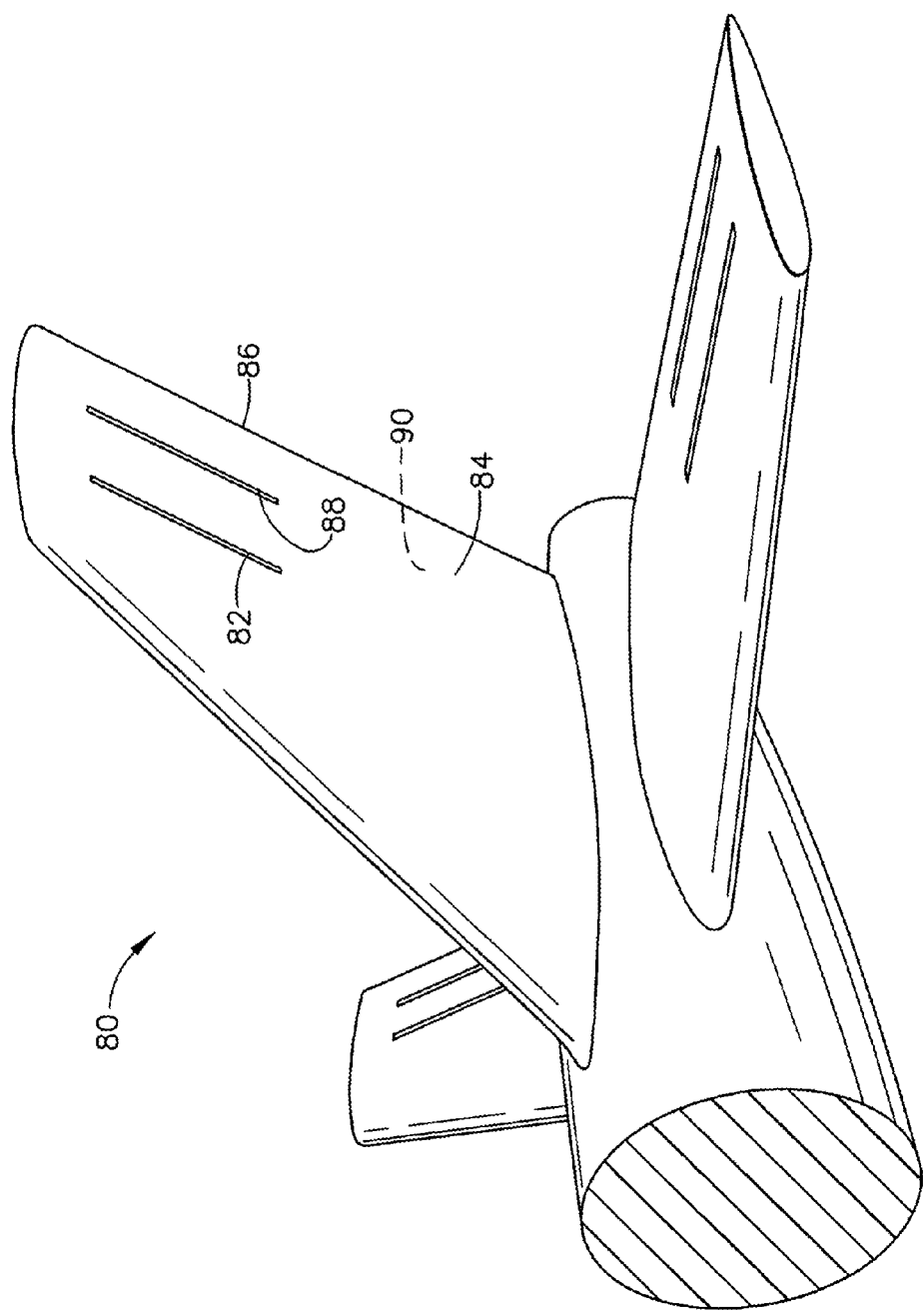
FIG. 5 is a perspective view of an air vehicle tail section.

FIG. 5 shows an air vehicle 80 having a generally vertical upstream orifice 82 positioned on a first side surface 84 of a vertical tail 86 of the air vehicle and a downstream orifice 88 positioned on the first side surface substantially parallel to the upstream orifice. As with the first embodiment, a second surface 90 opposite the first surface 84 is substantially free of orifices, which prevents air from being drawn into or directed out of the tail 86 through the second surface.

The principles of active flow control herein are not necessary limited to airfoils designed for transonic flight. The principles may also be applied to airfoils designed for supersonic flight.

The invention claimed is:

1. An air vehicle comprising:
    an airfoil designed for transonic flight, the airfoil having a region of supersonic flow during transonic flight, a surface of the airfoil having upstream and downstream orifices at or within the region; and
    an active flow control system for controlling air vehicle motion during transonic flight by controlling flow through the orifices to alter strength and location of a shock wave in the region, the system creating an aerodynamic imbalance to move the shock wave.

2. The air vehicle of claim 1, wherein the active flow control system creates the aerodynamic imbalance through virtual changes to a local surface slope of a supersonic flow pocket, thereby moving the shock wave forward or aft.

3. The air vehicle of claim 1, wherein the upstream and downstream orifices are located at beginning and end of the region.

4. The air vehicle of claim 1, wherein the upstream orifice is at 50-65% of chord length of the airfoil and the downstream orifice is at 65-90% of chord length of the airfoil.

5. The air vehicle of claim 1, wherein each orifice includes a one-way valve such that air can only move into the upstream orifice through its valve and only move out of the downstream orifice through its valve.

6. The air vehicle of claim 1, wherein the upstream and downstream orifices are in fluid communication; and wherein the system includes an actuator for causing pulsing air to flow into the upstream orifice and out of the downstream orifice during transonic flight to alter the strength and location of the shock wave.

7. The air vehicle of claim 6, wherein the actuator is selectively operated to vary a phase differential of air flowing into the upstream orifice and out of the downstream orifice.

8. The air vehicle of claim 6, wherein the actuator is operated at a frequency between about 150 Hz and 350 Hz.

9. The air vehicle as set forth in claim 6 wherein air is drawn toward the upstream orifice at 80-100 degrees with respect to the surface, and air is pushed away from downstream orifice at 80-100 degrees with respect to the surface.

10. The air vehicle of claim 9, wherein the drawing and pushing of air is out of phase.

11. An aircraft comprising:
    opposing first and second wings for transonic flight, each wing having an upper surface and a lower surface, the upper surface having a region of supersonic flow, the upper surface of each wing having an upstream orifice at a beginning of the region, and a downstream orifice at an end of the region, the upstream orifice in fluid communication with the downstream orifice; and
    an active flow control system for controlling flow of air into the upstream orifice and out of the downstream orifice of at least one of the wings during transonic flight to alter strength and location of a shock wave in the region, the strength and location of the shock wave altered to control motion of the aircraft during transonic flight.

12. The aircraft of claim 11, wherein air is drawn toward the upstream orifice at 80-100 degrees with respect to the surface, and air is pushed away from downstream orifice at 80-100 degrees with respect to the surface.

13. The aircraft of claim 11, wherein the drawing and pushing of air is performed out of phase.

14. The aircraft of claim 11, wherein the wings are fixed wings.

15. The aircraft of claim 11, wherein the system includes an actuator for causing pulsing air to flow into the upstream orifice and out of the downstream orifice of each wing during transonic flight and thereby alter the shock wave strength and location.

16. The aircraft of claim 15, wherein each actuator is operated at a frequency between about 150 Hz and 350 Hz.

17. A method of operating an air vehicle having a surface designed for transonic air flow, the method comprising:
    operating the air vehicle under transonic conditions, whereby a shock wave is present at a region of the surface; and
    controlling motion of the air vehicle during transonic flight, the motion control including drawing air into a first orifice at a beginning of the shock wave and pushing air out of a second orifice at an end of the shock wave such that strength and location of the shock wave is altered to create an aerodynamic imbalance.

18. The method of claim 17, wherein air is drawn into the upstream orifice at an angle of 80-100 degrees with respect to the surface, and air is pushed away from downstream orifice at an angle of 80-100 degrees with respect to the surface.

19. The method of claim 17, wherein the drawing and pushing of air is out of phase.

20. The method of claim 17, wherein controlling the motion includes forcing physical changes in at least one of lift, drag, side forces, and moments of the air vehicle.

* * * * *